(12) United States Patent　　　　(10) Patent No.:　US 12,630,677 B2

Lublin　　　　　　　　　　　　　　　(45) Date of Patent:　May 19, 2026

(54) RESIN SUITABLE FOR THREE-DIMENSIONAL PRINTING

(71) Applicant: James R. Glidewell Dental Ceramics, Inc., Newport Beach, CA (US)

(72) Inventor: Derek A. Lublin, Irvine, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

(21) Appl. No.: 18/659,687

(22) Filed: May 9, 2024

(65) Prior Publication Data

US 2024/0294712 A1　　　Sep. 5, 2024

Related U.S. Application Data

(63) Continuation of application No. 17/709,606, filed on Mar. 31, 2022, now Pat. No. 12,006,401.

(60) Provisional application No. 63/170,602, filed on Apr. 5, 2021.

(51) Int. Cl.
| | |
|---|---|
| *C08F 2/46* | (2006.01) |
| *B33Y 70/00* | (2020.01) |
| *C08F 2/50* | (2006.01) |
| *C08G 61/04* | (2006.01) |
| *C08G 81/00* | (2006.01) |
| *C08K 5/132* | (2006.01) |
| *C09D 187/00* | (2006.01) |

(52) U.S. Cl.
CPC .............. *C08G 81/00* (2013.01); *B33Y 70/00* (2014.12); *C08K 5/132* (2013.01); *C09D 187/005* (2013.01)

(58) Field of Classification Search
CPC ......... C08L 75/16; B33Y 70/00; C08G 18/44; C08G 81/00; C08K 5/132; C08K 5/005; C09D 187/005; C08F 290/067; C08F 220/1811; C08F 222/103
USPC ....................... 522/6, 189, 184, 71, 1; 520/1
See application file for complete search history.

(56) References Cited

U.S. PATENT DOCUMENTS

| | | | |
|---|---|---|---|
| 4,734,333 | A | 3/1988 | Leo et al. |
| 5,981,616 | A | 11/1999 | Yamamura et al. |
| 6,200,732 | B1 | 3/2001 | Tamura et al. |
| 6,451,958 | B1 | 9/2002 | Fan et al. |
| 6,709,271 | B2 | 3/2004 | Yin et al. |
| 7,357,637 | B2 | 4/2008 | Liechtung |
| 9,902,860 | B1 | 2/2018 | Liu et al. |
| 10,788,753 | B2 | 9/2020 | Cole |
| 10,849,724 | B2 | 12/2020 | Sun et al. |
| 11,225,535 | B2 | 1/2022 | Klun et al. |
| 2014/0239527 | A1 | 8/2014 | Lee |
| 2016/0185987 | A1* | 6/2016 | Saito ................... C08F 290/062 |
| | | | 524/854 |
| 2017/0158803 | A1 | 6/2017 | Amin et al. |
| 2017/0199657 | A1 | 7/2017 | Nixon et al. |
| 2018/0037758 | A1* | 2/2018 | Ishikawa ............... B29C 64/209 |
| 2019/0282335 | A1 | 9/2019 | Chen et al. |
| 2020/0247932 | A1 | 8/2020 | Share et al. |
| 2021/0317297 | A1 | 10/2021 | Jana et al. |
| 2022/0251250 | A1 | 8/2022 | Ling et al. |

FOREIGN PATENT DOCUMENTS

| | | | | |
|---|---|---|---|---|
| CN | 103080815 | A | * 5/2013 | ......... G02B 27/2214 |
| CN | 108504277 | A | 9/2018 | |
| JP | H0570535 | A | 3/1993 | |
| JP | 2019173038 | A | 10/2019 | |
| WO | WO 2015198493 | A1 | 12/2015 | |
| WO | WO 2020080643 | A1 | 4/2020 | |

OTHER PUBLICATIONS

Kim et al, CN 103080815 Machine Translation, May 1, 2013 (Year: 2013).*

* cited by examiner

*Primary Examiner* — Jessica Whiteley

(74) *Attorney, Agent, or Firm* — Klarquist Sparkman, LLP

(57)　　　　　　　ABSTRACT

A polymeric resin that includes a photocured reaction product of at least one urethane (meth)acrylate polymer that includes at least one polycarbonate unit; at least one monofunctional monomer; and at least one crosslinking agent.

21 Claims, No Drawings

RESIN SUITABLE FOR THREE-DIMENSIONAL PRINTING

RELATED APPLICATIONS

This application is a continuation of and claims the benefit of and priority to, U.S. patent application Ser. No. 17/709,606, filed Mar. 31, 2022, which claims the benefit of, and priority to, U.S. Provisional Patent Application No. 63/170,602, filed Apr. 5, 2021. The entireties of each of the foregoing applications are incorporated herein by reference.

BACKGROUND

The majority of commercial dental resins for three-dimensional (3D) printing are rigid and brittle as they are not intended to be flexed significantly. This can be quantified mainly by having a low tensile elongation (<50%) at break and low impact resistance (<15 J/m). Other 3D-printing materials are elastomeric, featuring high elongation at break (>200%) and impact resistance while sacrificing strength and rigidity (e.g. flexural strength <30 MPa and flexural modulus <800 MPa).

SUMMARY

Disclosed herein is a polymeric resin comprising a photocured reaction product of:
  at least one urethane (meth)acrylate polymer that includes at least one polycarbonate unit;
  at least one monofunctional monomer; and
  at least one crosslinking agent.
  Also disclosed herein is a composition comprising:
  at least one urethane (meth)acrylate polymer that includes at least one polycarbonate unit;
  at least one monofunctional monomer; and
  at least one crosslinking agent.
  Further disclosed herein is a method comprising:
  mixing together at least one urethane (meth)acrylate polymer that includes at least one polycarbonate unit; at least one monofunctional monomer; at least one crosslinking agent; and at least one photoinitiator; and
  irradiating the resulting mixture.
  Additionally disclosed herein is a method comprising:
  introducing at least one urethane (meth)acrylate polymer that includes at least one polycarbonate unit; at least one monofunctional monomer; at least one crosslinking agent; and at least one photoinitiator into a three-dimensional printer; and
  printing an object.
The foregoing will become more apparent from the following detailed description.

DETAILED DESCRIPTION

Terminology

The following explanations of terms and methods are provided to better describe the present compositions and methods, and to guide those of ordinary skill in the art in the practice of the present disclosure. It is also to be understood that the terminology used in the disclosure is for the purpose of describing particular embodiments and examples only and is not intended to be limiting.

"Biocompatible" is a term describing something that can be substantially non-toxic in the in vivo environment of its intended use, and is not substantially rejected by the patient's physiological system (e.g., is nonantigenic). A biocompatible structure or material, when introduced into a majority of subjects, will not cause a significantly adverse reaction or response. For example, a biocompatible structure or material does not cause toxic or injurious effects on a tissue, organ, or graft.

"Curable" and "curing" as used herein includes polymerizable and crosslinkable, and polymerizing and crosslinking.

"(Meth)acrylate" encompasses acrylates and methacrylates.

As used herein, "polymer" encompasses prepolymers, oligomers and both homopolymers and copolymers; the term "polymer" refers to a macrostructure having a number average molecular weight (Mn) of at least 5,000 Daltons, at least 10,000 Dalton, at least 25,000 Dalton, at least 50,000 Dalton, at least 100,000 Dalton, at least 300,000 Dalton, at least 500,000 Dalton, at least 750,000 Dalton, at least 1,000,000 Dalton, or even at least 1,500,000 Dalton and up to 3,000,000 Daltons, up to 2,000,000 Daltons, or up to 1,000,000 Daltons. The molecular weight can be determined by gel permeation chromatography. The term polymer can refer to homopolymers, copolymers, terpolymers, and the like. The polymer can be a random or block copolymer.

The term "polymer backbone" refers to the main continuous chain of the polymer.

The disclosure of numerical ranges should be understood as referring to each discrete point within the range, inclusive of endpoints, unless otherwise noted. Unless otherwise implicitly or explicitly indicated, or unless the context if properly understood by a person of ordinary skill in the art to have a more definitive construction, non-numerical properties such as amorphous, continuous, crystalline, homogeneous, and so forth as used in the specification or claims are to be understood as being modified by the term "substantially," meaning to a great extent or degree. Accordingly, unless otherwise indicated, implicitly or explicitly, the numerical parameters and/or non-numerical properties set forth are approximations that may depend on the desired properties sought, limits of detection under standard test conditions/methods, limitations of the processing method, and/or the nature of the parameter or property. When directly and explicitly distinguishing embodiments from discussed prior art, the embodiment numbers are not approximates unless the word "about" is recited.

Overview and Certain Embodiments

Disclosed herein are 3D-printable photopolymerizable compositions having balanced rigidity and ductility, as well as high degree of polymerization, for use in making dental devices. Objects printed from the compositions disclosed have desirable elongation, impact, and flexural properties.

Cured polymeric resins produced from the photocurable composition have a higher elongation and impact resistance than standard 3D-printed resins, and the flexural properties are significantly higher than elastomeric resins. Additionally, the photocurable composition is capable of reaching a very high degree of polymerization (e.g., >98%) when cured properly (measured via ATR-FTIR). A desirable property of the cured resin is that it becomes softer at and above normal human body temperature, allowing it to be easily deformed. When it cools, it can hold its new position until heated again, after which it recovers its original shape. The combination of these properties allows the cured resin to fit a broad array of applications.

In certain embodiments, the polymeric resin is a reaction product of at least one urethane (meth)acrylate polymer that includes at least one polycarbonate unit; at least one mono-functional monomer; and at least one crosslinking agent.

Urethane (Meth)acrylate Polymer that Include at Least One Polycarbonate

The urethane (meth)acrylate polymer that include at least one polycarbonate unit provides long polymeric chains and cushioning for the polymerized object's impact resistance and flexibility. In certain embodiments, the urethane (meth) acrylate polymer is a urethane acrylate polymer.

In certain embodiments, the urethane (meth)acrylate polymer that includes a polycarbonate backbone structure may be a radiation curable urethane (meth)acrylate polymer including at least one of a co-polymeric polycarbonate unit and a co-reacted urethane acrylate unit.

For example, the curable urethane (meth)acrylate polymer may be a reaction product of ingredients including:

[i] a first homopolymeric or co-polymeric polycarbonate polyol; and

[ii] an organic diisocyanate; and

[iii] a hydroxy-functional acrylate or methacrylate of general formula $$(Acr)_y\text{—}(A)\text{—}OH$$

where Acr is an acrylate or methacrylate group, A is the residue of a polyol $A(OH)_y$ with y being an integer ranging from 1 to 5, preferably A is selected from $C_2$ to $C_{18}$ alkyl and $C_2$ to $C_{18}$ alkyl that may be modified by at least one unit of a cyclic ester in particular capro-lactone or A is $C_2$ to $C_{18}$ alkoxylated alkyl, with alkoxy being in $C_2$ to $C_4$, and preferably the acrylate or methacrylate having a functionality in acrylate or meth-acrylate groups ranging from 1 to 5, and with the proviso that when the first polycarbonate polyol is not co-polymeric, then the ingredients further includes:

[iv] a second homopolymeric or co-polymeric polycar-bonate polyol, and wherein the polycarbonate polyol(s) is/are linked to the diisocyanate via a urethane linkage, and wherein the diisocyanate is linked to the alkyl moiety of the hydroxy-functional acrylate or methacrylate via a urethane linkage.

The urethane (meth)acrylate polymer may be made by a) reacting one of said hydroxy-functional acrylate or meth-acrylate according to iii) and the said polycarbonate polyol according to i) with a molar excess of said isocyanate according to ii) by progressive addition of said hydroxy-functional acrylate or methacrylate according to iii) or the polycarbonate polyol i) in said isocyanate ii), in the presence of an urethane reaction catalyst and of a polymerization inhibitor, to form an isocyanate adduct; and then b) reacting the resultant isocyanate adduct of step a) with the other of iii) and i) by progressive addition of the other of iii) of i) into said adduct to the resulting reactive mixture to obtain the said polymer. In one aspect of the embodiment, if the second polycarbonate polyol according to iv) is used, the progres-sive addition of the first polycarbonate polyol according to i) may be followed by a successive step with said polycar-bonate polyol according to iv) by progressive addition of iv). In one aspect, both reaction steps a) and b) may be in bulk and in the absence of any solvent.

The term "polycarbonate polyol" or "PC polyol" means a polycarbonate (PC) polyol having an aliphatic or cycloali-phatic or aromatic hydrocarbyl chain. The chain may be an alkyl group, such as $C_1$ to $C_{18}$ alkyl, preferably $C_2$ to $C_{18}$ alkyl, more preferably $C_2$ to $C_{12}$ alkyl, still more preferably $C_2$ to $C_6$ alkyl; a cycloaliphatic group such as $C_6$ to $C_{18}$ cycloaliphatic group which may be substituted on the ali-phatic chain, preferably $C_6$ to $C_{12}$ cycloaliphatic group; or an aromatic group such as a $C_6$ to $C_{18}$ aromatic group. The PC polyol may be modified with a cyclic ester such as lactide, glycolide and caprolactone. Diol may be preferred among the polyols.

The aliphatic, cycloaliphatic or aromatic polycarbonate polyol may be a PC diol which may be based on ethylene glycol, propylene glycol, butanediol, pentanediol, hexane-diol, heptanediol, octanediol, nonanediol, decanediol, cyclo-propanediol, cyclobutanediol, cyclopentanediol, cyclo-hexanediol, cycloheptanediol, cyclooctanediol, cyclopropanediethanol, cyclobutanedimethanol, cyclopen-tanediethanol, cyclohexanediethanol, cycloheptanedietha-nol, cyclooctanediethanol, cyclopentanediethanol, cyclo-hexanediethanol, cycloheptanediethanol, cyclooctanediethanol, cyclopropanediethanol, cyclobu-tanediethanol, cyclopentanediethanol, cyclohexanedietha-nol, cycloheptanediethanol, cyclooctanediethanol, cyclo-pentanediethanol, cyclohexanediethanol, cycloheptanediethanol, cyclooctanediethanol, or ethoxy-lated bisphenol A, that may be unbranched or branched.

The term "co-polymeric polycarbonate polyol" or "co-polymeric PC polyol" means a polycarbonate (PC) polyol prepared by a copolymerization between two or more kinds of monomers such as those exemplified above. The "co-polymeric PC polyols" generally exclude homopolymeric PC polyols. In an embodiment, the curable urethane acrylate polymer may have a chemical structure derived from a co-polymeric PC polyol. The co-polymeric PC polyol may include, but is not limited to, a poly $C_2$ to $C_{18}$ diol carbonate modified with a cyclic ester such as lactide, glycolide and caprolactone, and a co-polymerized carbonate of two or more poly $C_2$ to $C_{18}$ alkylene, cycloalkylene, or cycloalky-lalkylene diol carbonate. In one preferred embodiment, carbonate such as caprolactone co-polymerized polyhexane-diol carbonate; or a co-polymerized carbonate of two poly-alkyl, polycycloalkyl or polycycloalkylalkyl polyols, such as a co-polymerized carbonate of polycyclohexane dimetha-nol and polyhexane diol.

In an embodiment, the urethane (meth)acrylate polymer includes moieties derived from two or more kinds of homopolymeric (i.e., non-co-polymeric) polycarbonate polyols. In another embodiment, the urethane acrylate poly-mer includes moieties derived from one or more kinds of co-polymeric polycarbonate polyol(s) and optionally one or more kinds of homopolymeric polycarbonate polyol(s).

The homopolymeric or co-polymeric polycarbonate poly-ols may have the number average molecular weight (Mn) of 500 to 3,000, preferably 500 to 2,000, and more preferably 500 to 1,000. The number average molecular weight is calculated from OH value determined by KOH titration.

In an embodiment, the urethane (meth)acrylate polymer may have formula (I)

$$(Acr)_y(A)(Q)(PC)[(Q)(PC)]_x(Q)(A)(Acr)_y \quad (I)$$

in which PC is the residue of the polycarbonate diol as described above.

In an embodiment, the polycarbonate diol above may have the formula (II)

$$HO(ROCOO)_nROH \quad (II)$$

In formula (II), R may be independently selected from $C_1$ to $C_{18}$ alkylene, $C_6$ to $C_{18}$ cycloalkylene which may be substituted on the alkylene chain above, and $C_6$ to $C_{18}$ aromatic groups. In one aspect, the alkylene may be $C_2$ to $C_{12}$ alkylene, preferably $C_2$ to $C_8$ alkylene. In one aspect, the cycloalkylene may be $C_6$ to $C_{12}$ cycloalkylene.

In an aspect, R may be an alkylene selected from hexamethylene, pentylene, cyclohexylene, ethylene, propylene, butylene, and cyclohexanedimethylene, or be an aromatic moiety such as ethoxylated bisphenol A.

In formula (II), n may be an integer from 1 to 100,000, preferably 1 to 10,000.

Urethane compounds have a skeleton having a urethane linkage, such as —NH—C(O)O—. In the present specification, the term "co-reacted urethane" or "co-reacted urethane acrylate (UA)" means a urethane or urethane acrylate compound comprising two or more kinds of polycarbonate moieties. In an embodiment, the urethane acrylate polymer may have a chemical structure of a co-reacted urethane. In another embodiment, the urethane acrylate polymer may have a chemical structure including a co-reacted urethane moiety and the residue of a co-polymerized polycarbonate polyol.

For instance, a polymer containing moieties derived from two or more kinds of co-polymeric or homopolymeric polycarbonate polyols, the polymer may be considered as to have a "co-reacted UA" structure. The molar ratio among the two of two or more PC polyols that used for preparing a co-reacted UA may be in the range of 100:1 to 1:100, preferably 10:1 to 1:10, more preferably 2:1 to 1:2, still more preferably 1.5:1 to 1:1.5. The ratio may be determined from physical and/or chemical properties of the ingredients, e.g. viscosity, Tg, transparency, and hardness. In one embodiment, the ratio may be adjusted such that the overall viscosity is well-balanced, since urethane component generally has higher viscosity.

Note that the terms of "co-reacted" and "co-polymeric" basically excludes a non-substantial use of a plurality of reactants of the same class, e.g., those inevitably incorporated in a composition during a manufacturing process. In general, the phrase "co-reacted" or "co-polymeric" do not mean an embodiment in which the second or later reactant(s) are in trace amount. For instance, a "co-reacted" UA would not be prepared from a substantial amount of first PC polyol and a non-substantial or trace amount of second PC polyol.

The urethane (meth)acrylate polymer includes a moiety derived from an isocyanate compound. In an embodiment, the urethane acrylate polymer may have formula (I) above, in which Q is the residue of the isocyanate. The isocyanate may connect with A and PC via a urethane linkage.

In an embodiment, the isocyanate or polyisocyanate may have 6 to 18 carbon atoms, preferably 6 to 12 carbon atoms, except for those contained in the NCO groups. The lower number of carbon atoms, $C_2$ to $C_5$, may not be preferred since low-C isocyanate compounds are generally too volatile for any practical use, and would exert toxicity.

An isocyanate or polyisocyanate used in an embodiment may be aliphatic, cycloaliphatic or aromatic with various number of isocyanate groups, preferably two or more isocyanate groups per molecule. The isocyanate compounds may include, but not limited to, isophorone diisocyanate (IPDI), toluene diisocyanate (TDI), dicyclohexylmethane 4,4'-diisocyanate (MDI), hexamethylene diisocyanate, 4,4'-methylenebis(phenylisocyanate), xylenediisocyanate, octadecyl isocyanate, 1,5-naphthylene diisocyanate, dianisidine diisocyanate, and polymethylene polyphenylisocyanates. The polyisocyanates may be dimers, trimers, and polymers in nature such as allophanates, isocyanurates, uretdiones, biurets, of hexamethylene diisocyanate and isophorone diisocyanate.

The urethane (meth)acrylate polymer may include a portion or the residue derived from a hydroxy-functional acrylate or methacrylate, such as hydroxyalkyl acrylate or hydroxyalkyl methacrylate. In an embodiment, the portion made from (meth)acrylate may be a capping or terminal group of the polymer having the formula of $(Acr)_y$ (A), where Acr is an acrylate or methacrylate moiety, and A may be an alkyl moiety A having 2 to 18 carbon atoms, preferably 2 to 12 carbon atoms, more preferably 6 to 12 carbon atoms. A may also be modified by at least one unit of a cyclic ester such as caprolactone. In one aspect, A may be alkoxylated alkyl having 2 to 18 carbon atoms, in which the alkoxy moiety has 2 to 4 carbon atoms. The number of y may be an integer from 1 to 5. In other words, "A" may be represented as the residue of a polyol A(OH)y+1 with y being an integer ranging from 1 to 5.

Hydroxyl containing (meth)acrylic esters may be monoesters or multi-functional esters, such as pentaerythitol triacrylate, trimethyolpropane diacrylate, hydroxyethyl acrylate, hydroxypropyl acrylate, hydroxypropyl methacrylate, hydroxyethyl methacrylate, and caprolactone-modified hydroxyl functional (meth)acrylate.

In certain embodiments, the urethane (meth)acrylate polymer that includes a polycarbonate backbone structure may be a polymer of the formula (III)

$$(Acr)_y(A)(Q)(PC)[(Q)(PC)]_x(Q)(A)(Acr)_y,$$

wherein $(Acr)_y(A)$ is the residue of hydroxyalkyl acrylate or hydroxyalkyl methacrylate having an alkyl moiety, A, and where said alkyl, A, has 2 to 5 carbon atoms and wherein Acr is an acrylate or methacrylate moiety; y is the number of acrylate or methacrylate groups linked to moiety A; Q is the residue of one or more organic diisocyanates, which are connected with A via a urethane linkage;

PC is the residue of an alkylene diol polycarbonate of the formula (IV)

$$HO(ROCOO)_nROH$$

wherein

R is one or more ($C_2$ to $C_{10}$) alkylene or one or more ($C_6$ to $C_{12}$) aromatic group;

y is an integer from 1 to 5;

x is from 1 to 20;

n is an integer from 1 to 10,000; and

PC and Q are connected via a urethane group.

The polyisocyanates for Q can be aliphatic or aromatic with various number of isocyanate groups, preferably two or more isocyanate groups per molecule. Some examples of isocyanates are isophorone diisocyanate, toluene diisocyanate, 4,4'-dicyclohexylmethane diisocyanate, hexamethylene diisocyanate, 4,4'-methylenebis(phenyl isocyanate). The polyisocyanates can be dimers, trimers, and polymers in nature such as allophanates, isocyanurates, uretdiones, biurets, of hexamethylene diisocyanate and isophorone diisocyanate. Preferred polyisocyanates are diisocyanates mentioned above such as isophorone diisocyanates, hexamethylene diisocyanate, and toluene diisocyanate, 4,4'-dicyclohexylmethane diisocyanate.

The hydroxyl containing (meth)acrylic esters can be monoesters or multifunctional esters. Some examples are hydroxyalkyl (meth)acrylates, pentaerythitol triacrylate, trimethyololpropane diacrylate, hydroxyethyl acrylate, hydroxypropyl acrylate, hydroxypropyl methacrylate, hydroxyethyl methacrylate, caprolactone modified hydroxy functional (meth)acrylate.

The polycarbonate polyols can be aromatic or aliphatic and they can be prepared readily from diols as described in the art. Some examples are pentanediol based polycarbonate diol, cyclohexanedimethanol polycarbonate diol, hexanediol polycarbonatediol, ethylene glycol polycarbonatediol, propylene glycol polycarbonate diol, butanediol polycarbonatediol, and polycarbonate diol based on ethoxylated bisphenol A In certain embodiments, the urethane (meth)acrylate polymer has a weight average molecular weight, $M_w$, of 300 to 1,000,000.

In certain embodiments Acr is derived from a monomer selected from the group consisting of hydroxyethyl acrylate, hydroxyethyl methacrylate, caprolactone-modified hydroxyethyl acrylate, and caprolactone-modified hydroxyethyl methacrylate.

In certain embodiments, R is alkylene selected from the group consisting of hexamethylene, pentane, cyclohexane, ethane, propane, butane, and cyclohexanedimethyl.

In certain embodiments, Q is derived from an organic polyisocyanate selected from the group consisting of isophorone diisocyanate, toluene diisocyanate, 4,4'-dicyclohexylmethane diisocyanate, hexamethylene diisocyanate, and 4,4'-methylenebis(phenyl isocyanate).

In certain embodiments, R is an aromatic selected from the group consisting of polycarbonate diols based on ethoxylated bisphenol A.

In certain embodiments, the hydroxyalkyl acrylate or hydoxyalkyl methacryate is selected from the group consisting of hydroxyethyl acrylate, hydroxyethyl methacrylate, pentaerythitol triacrylate, pentaerythitol trimethacrylate, trimethyololpropane diacrylate, trimethyololpropane dimethacrylate, hydroxypropyl acrylate, hydroxypropyl methacrylate, caprolactone modified hydroxy functional acrylate, and caprolactone modified hydroxy functional methacrylate.

Illustrative urethane (meth)acrylates that include a polycarbonate backbone structure are described, for example, in WO 2015/198493 and U.S. Pat. No. 6,451,958.

Monofunctional Monomer(s)

The photocurable composition also includes at least one monofunctional monomer. As used herein, a "monofunctional monomer" has only a single (meth)acrylate group. In certain embodiments, the monofunctional monomer serves as a reactive diluent. In certain embodiments, the monofunctional monomer raises the glass transition temperature ($T_g$) of the photocurable composition by adding bulkiness to the polymeric backbone, increasing rigidity and creating a hard surface. In certain embodiments, the monofunctionality minimizes crosslinking density to preserve the cured object's flexibility. In certain embodiments, the monofunctional monomer has a glass transition temperature ($T_g$) of greater than 50° C. In certain embodiments, the monofunctional monomer has a viscosity of less than 100 cP at 25° C. In certain embodiments, the monofunctional monomer has limited solubility in water. The monomer may be considered very slightly soluble in water with a solubility of less than 1000 mg/L at 25° C., or more preferably it may be considered practically insoluble in water with a solubility of less than 100 mg/L at 25° C.

In certain embodiments, the monofunctional monomer is isobornyl acrylate (IBOA), isobornyl methacrylate (IBOMA), dihydrodicyclopentadienyl acrylate (DCPA), tert-butyl methacrylate (TBMA), cyclohexyl methacrylate (CHMA), benzyl methacrylate (BzMA), or a mixture thereof.

Crosslinking Agent(s)

In certain embodiments, the crosslinking agent is a difunctional or multifunctional monomer. The crosslinking agent holds the polymeric network sufficiently together to keep the monomer chains from slipping without adding brittleness. The crosslinking agent has at least two (meth) acrylate functional groups that undergo crosslinking. In certain embodiments, the crosslinking agent has three (meth)acrylate functional groups that undergo crosslinking. In certain embodiments, the crosslinking agent has a viscosity of less than 1000 cP at 25° C., or more preferably less than 100 cP at 25° C. In certain embodiments, the crosslinking agent has limited solubility in water. The monomer may be considered very slightly soluble in water with a solubility of less than 1000 mg/L at 25° C., or more preferably it may be considered practically insoluble in water with a solubility of less than 100 mg/L at 25° C.

In certain embodiments, the crosslinking agent is trimethylolpropane trimethacrylate (TMPTMA), trimethylolpropane triacrylate (TMPTA), trimethylolpropane ethoxy triacrylate (TMPEOTA), pentaerythritol triacrylate (PETA), tripropyleneglycol diacrylate (TPGDA), hexanediol diacrylate (HDDA), or a mixture thereof.

Photoiniator(s), UV Blocker(s), Other Additives

The photocurable composition also includes a photoinitiator. Photoinitiators include those that can initiate curing of the reactive mixture at wavelengths (for example, 365 to 405 nm) used for 3D-printing. Illustrative photoinitiators include 2,4,6-trimethylbenzoyldi-pPhenylphosphinate, diphenyl(2, 4,6-trimethylbenzoyl)phosphine oxide and phenylbis(2,4,6-trimethylbenzoyl)phosphine oxide.

The composition may also include at least one UV blocker. The UV blocker minimizes light scattering during 3D-printing, and prevents polymerization under ambient light. Illustrative UV blockers include 2-hydroxy-4-methoxybenzophenone and 2,2'-(2,5-thiophenediyl)bis(5-tert-butylbenzoxazole).

In certain embodiments, the composition may include at least one additive that imparts color to the cured resin.

The composition may include other additives such as inorganic fillers, including fumed silica, glass powders and fibers, and ceramic powders. These fillers may improve resin properties such as rigidity, wear resistance, volumetric shrinkage, and chemical resistance.

A method for forming the photocurable composition includes combining the various components of the composition. The components can be added in any suitable order and in a suitable amount. The method of combining is not specifically limited, and can comprise stirring, shaking, milling, or ultrasonic mixing. If transported or stored, the photocurable composition is preferably protected from light and or heat.

The amount of the urethane (meth)acrylate polymer in the photocurable composition may be from 30 to 75, more preferably 40 to 65, and most preferably 50 to 60, wt %, based on the total weight of the photocurable composition.

The amount of the monofunctional monomer in the photocurable composition may be from 15 to 75, more preferably 30 to 60, and most preferably 40 to 50, wt %, based on the total weight of the photocurable composition.

The amount of the crosslinking agent in the photocurable composition may be from 1 to 25, more preferably 1 to 10, and most preferably 1 to 5, wt %, based on the total weight of the photocurable composition.

The preprinting photocurable composition viscosity may range from 200 cP at 25° C. to 3000 cP at 25° C., more particularly from 800 cP at 25° C. to 1300 cP at 25° C.

The photocurable compositions disclosed herein are particularly useful for additive manufacturing (AM), which includes 3D-printing and solid free-form fabrication, allows for the production of three-dimensional solid objects of virtually any shape from a digital model. Generally, this is achieved by creating a digital blueprint of a desired structure with computer-aided design (CAD) modeling software and then slicing that virtual blueprint into digital cross-sections. These cross-sections are formed or deposited in a sequential layering process to create the 3D structure. Illustrative 3D-printing techniques include stereolithography (SLA), digital light processing (DLP) and continuous liquid interface production (CLIP). In certain embodiments, SLA and DLP are preferred. In certain embodiments, DLP is particularly preferred. In certain embodiments, the photocurable composition is formulated for 385 nm 3D printers. In certain embodiments, the photocurable composition is formulated for 405 nm 3D printers.

The cure rate of photocurable composition layers may depend on the tendency the composition components to polymerize by free radical reactions during curing by a light source (e.g., an ultraviolet light). A layer of composition, when provided in a thickness suitable for 3D printing or other additive manufacturing, may be able to photocure in time lengths desired for efficient production of an article.

The 3D-printed object can optionally be post-cured, e.g., further crosslinked. This can be accomplished by further exposure to UV radiation and/or heat.

In certain embodiments, the cured resin may have a degree of polymerization conversion of at least 90%, more preferably at least 95%, as measured by ATR-FTIR.

In certain embodiments, the cured resin may have a tensile strength of 20 to 50 MPa, more preferably 30 to 45 MPa, as measured via ASTM D638-14.

In certain embodiments, the cured resin may have an elongation to break of 50 to 200%, more preferably 150 to 200%, as measured via ASTM D638-14.

In certain embodiments, the cured resin may have a flexural strength of 20 to 70 MPa, more preferably 40 to 60 MPa, as measured via ASTM D790-17.

In certain embodiments, the cured resin may have a flexural modulus of 1000 to 2000 MPa, more preferably 1200 to 1500, as measured via ASTM D790-17.

In certain embodiments, the cured resin may have an impact resistance of 15 to 75 J/m, more preferably 35 to 55 J/m, as measured via ASTM D256-10 (Notched Izod).

The resulting polymeric object can have any suitable configuration or shape. The resin disclosed herein is particularly useful for making biocompatible dental appliances. Illustrative dental appliances include bite splints, mouth guards, night guards, surgical guides, flexible dentures, bleaching trays, retainers, and aligners. The resin could also be useful for producing objects for treating sleep apnea. The resin could also be useful for producing cosmetic-enhancing objects. An illustrative cosmetic-enhancing object is an appliance that fits over pretreated dentition without requiring cementation or other fixation techniques.

EXAMPLES

In certain embodiments, the resin may be printed on an Asiga Max UV printer, which is a DLP 3D printer with a 385 nm wavelength LED light source. The resin may be printed on either 385 nm or 405 nm wavelength printers, but certain preferred photoinitiators (e.g. TPO) absorb light more efficiently at 385 nm. After printing, objects are removed from the printer's build plate, washed with 99% isopropyl alcohol in an ultrasonic cleaner for two five minute cycles, submerged in a dish filled with preheated glycerin (60° C.), and post-cured in an Otoflash G171 curing unit for 3000 flashes per side (10 minutes).

Print time is highly dependent on the dimensions of the printed object, the orientation of the object, as well as the individual printer's specifications due to light source variation. The printer used in this example had a layer exposure time of 4.0 seconds at 5.73 mW/cm$^2$ light intensity and 0.1 mm layer thickness with no added heat (printed at 20° C.). Typical prints that contain a build plate nested with night guards, splints, or other objects with similar geometries may take 1 to 2 hours when oriented at a 45 degree angle.

The preprinting mixture viscosity for this resin was 1027 cP at 25° C.

An example of a photocurable composition is described below.

| Component | Description | Wt % |
| --- | --- | --- |
| Polycarbonate urethane acrylate | Oligomer | 50 |
| Isobornyl Acrylate (IBOA) | Reactive Diluent | 46.45 |
| Trimethylolpropane Trimethacrylate (TMPTMA) | Crosslinker | 2.5 |
| 2-Hydroxy-4-methoxybenzophenone (UV-9) | UV Blocker | 0.05 |
| Diphenyl(2,4,6-trimethylbenzoyl)phosphine oxide (TPO) | Photoinitiator | 1 |

Certain properties of the above-described inventive composition compared to commercially available KeyStone Industries' KeySplint Soft® resin and Graphy's Tera Harz TC-85DAW are shown in the table below.

KeySplint Soft resin was printed and post-cured according to directions provided by KeyStone Industries. The resin was printed on an Asiga Max UV printer with a calibrated exposure time of 3.9 seconds at 5.73 mW/cm$^2$ light intensity and 0.1 mm layer thickness. The resin was heated to 30° C. in the vat prior to printing per the material's printing directions. Printed samples were washed in an agitated bath filled with 99% isopropyl alcohol for five minutes and post-cured in an Otoflash G171 curing unit for 2000 flashes per side.

Tera Harz TC-85DAW samples were printed in an Asiga Max printer with a 405 nm wavelength light source and a calibrated exposure time of 1.5 seconds at 22.60 mW/cm$^2$ light intensity and 0.1 mm layer thickness with no added heat (printed at 20° C.). Printed samples were washed in an agitated bath filled with 99% isopropyl alcohol for five minutes and post-cured in an Otoflash G171 curing unit for 4000 flashes per side.

| Comparative Properties | | | | |
| --- | --- | --- | --- | --- |
| Property | Method | Inventive Polymeric Resin | Graphy Tera Harz TC-85 | KeySplint Soft |
| Degree of Conversion | ATR-FTIR | >99% | >91% | >98% |
| Tensile Strength (MPa) | ASTM D638-14 | 32.14 ± 1.50 | 30.68 ± 1.91 | 28.99 ± 1.46 |
| Elongation at Break (%) | ASTM D638-14 | 185 ± 14 | 202 ± 12 | 227 ± 36 |
| Flexural Strength (MPa) | ASTM D790-17 | 51.67 ± 0.53 | 26.97 ± 0.47 | 47.47 ± 0.67 |
| Flexural Modulus (MPa) | ASTM D790-17 | 1384.52 ± 31.27 | 700.47 ± 14.44 | 1321.49 ± 62.44 |
| Impact Resistance (J/m) | ASTM D256-10 (Notched Izod) | 44.31 ± 6.07 | 47.33 ± 8.77 | 61.40 ± 3.73 |

The presently disclosed inventive polymeric resin is significantly more rigid than Tera Harz TC-85DAW while maintaining close values in elongation and impact resistance. The degree of polymerization is also higher, which could be advantageous for enhancing device property stability and biocompatibility. Therefore, the inventive polymeric resin could readily be used in place of Tera Harz TC-85DAW for the aforementioned illustrative appliances.

The presently disclosed inventive polymeric resin has a slightly higher strength and rigidity than KeySplint Soft, but the elongation and impact resistance are lower. This tradeoff places the inventive polymeric resin's strength and rigidity closer to traditional thermoformed hard night guards, which are significantly more rigid than the 3D-printed resins listed.

The difference in rigidity could allow the presently disclosed inventive polymeric resin to be used in certain applications where other materials are unsuitable, such as for thin cosmetic appliances (e.g., Smile Transitions™ appliances available from Glidewell) and partial dentures.

In view of the many possible embodiments to which the principles of the disclosed invention may be applied, it should be recognized that the illustrated embodiments are only preferred examples of the invention and should not be taken as limiting the scope of the invention.

What is claimed is:

1. A method comprising:
mixing together at least one urethane (meth)acrylate polymer that includes at least one polycarbonate unit; at least one monofunctional monomer; at least one crosslinking agent; and at least one photoinitiator, wherein the resulting mixture has a viscosity of 200 cP at 25° C. to 3000 cP at 25° C.; and
introducing the resulting mixture into a three-dimensional printer, and
printing the mixture while irradiating the mixture.

2. The method of claim 1, comprising irradiating the mixture at a wavelength of 365 to 405 nm.

3. The method of claim 1, wherein the urethane (meth) acrylate polymer has a polymer backbone, wherein the polymer backbone includes the at least one polycarbonate unit.

4. The method of claim 1, wherein the urethane (meth) acrylate polymer includes at least one of a co-polymeric polycarbonate unit and a co-reacted urethane acrylate unit.

5. The method of claim 1, wherein the urethane (meth) acrylate polymer has the formula (III):

$$(Acr)_y(A)(Q)(PC)[(Q)(PC)]_x(Q)(A)(Acr)_y$$

wherein
$(Acr)_y(A)$ is the residue of hydroxyalkyl acrylate or hydroxyalkyl methacrylate having an alkyl moiety, A, and where said alkyl, A, has 2 to 5 carbon atoms and wherein Acr is an acrylate or methacrylate moiety; y is the number of acrylate or methacrylate groups linked to moiety A;
Q is the residue of one or more organic diisocyanates, which are connected with A via a urethane linkage;
PC is the residue of an alkylene diol polycarbonate of the formula (IV):

$$HO(ROCOO)_nROH$$

wherein
R is one or more ($C_2$ to $C_{10}$) alkylene or one or more ($C_6$ to $C_{12}$) aromatic group;
y is an integer from 1 to 5;
x is from 1 to 20;
n is an integer from 1 to 10,000; and
PC and Q are connected via a urethane group.

6. The method of claim 1, wherein the monofunctional monomer has a glass transition temperature ($T_g$) of greater than 50° C.

7. The method of claim 1, wherein the monofunctional monomer has a viscosity of less than 100 cP at 25° C.

8. The method of claim 1, wherein the monofunctional monomer is hydrophobic.

9. The method of claim 1, wherein the monofunctional monomer has a single (meth)acrylate group.

10. The method of claim 1, wherein the monofunctional monomer is isobornyl acrylate (IBOA), isobornyl methacrylate (IBOMA), dihydrodicyclopentadienyl acrylate (DCPA), tert-butyl methacrylate (TBMA), cyclohexyl methacrylate (CHMA), benzyl methacrylate (BzMA), or a mixture thereof.

11. The method of claim 1, wherein the crosslinking agent is a difunctional or multifunctional monomer.

12. The method of claim 1, wherein the crosslinking agent has a viscosity of less than 1000 cP at 25° C.

13. The method of claim 1, wherein the crosslinking agent is hydrophobic.

14. The method of claim 1, wherein the crosslinking agent is trimethylolpropane trimethacrylate (TMPTMA), trimethylolpropane triacrylate (TMPTA), trimethylolpropane ethoxy triacrylate (TMPEOTA), pentaerythritol triacrylate (PETA), tripropyleneglycol diacrylate (TPGDA), hexanediol diacrylate (HDDA), or a mixture thereof.

15. The method of claim 1, further comprising a UV blocker.

16. The method of claim 1, wherein a body formed from the mixture after printing and irradiating has a degree of polymerization conversion of at least 90%, as measured by ATR-FTIR.

17. The method of claim 1, wherein a body formed from the mixture after printing and irradiating has a tensile strength of 20 to 50 MPa, as measured via ASTM D638-14.

18. The method of claim 1, wherein a body formed from the mixture after printing and irradiating has an elongation to break of 50 to 200%, as measured via ASTM D638-14.

19. The method of claim 1, wherein a body formed from the mixture after printing and irradiating has a flexural strength of 20 to 70 MPa as measured via ASTM D790-17.

20. The method of claim 1, wherein a body formed from the mixture after printing and irradiating has a flexural modulus of 1000 to 2000 MPa, as measured via ASTM D790-17.

21. The method of claim 1, wherein a body formed from the mixture after printing and irradiating has an impact strength of 15 to 75 J/m, as measured via ASTM D256-10 (Notched Izod).

\* \* \* \* \*